(12) United States Patent  
Danial et al.

(10) Patent No.: US 6,327,065 B1
(45) Date of Patent: Dec. 4, 2001

(54) FINE POINTING ASSEMBLY CONFIGURATION

(75) Inventors: Ashley Powers Danial, Redondo Beach; Arthur P. Balz, Jr., Anaheim, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/481,921

(22) Filed: Jan. 13, 2000

(51) Int. Cl.[7] .......................... G02B 26/08; G02B 7/182
(52) U.S. Cl. .................. 359/198; 359/223; 359/224; 359/225; 359/226; 359/872; 359/876
(58) Field of Search ........................ 359/871–874, 359/876, 198, 199, 212, 220, 221, 223, 224–226; 250/234–236, 206.1

(56) References Cited

U.S. PATENT DOCUMENTS

| 3,504,182 | 3/1970 | Pizzurro et al. . |
| 3,511,998 | 5/1970 | Smokler . |
| 4,017,146 | 4/1977 | Lichtman . |
| 4,982,445 | 1/1991 | Grant et al. . |
| 5,060,304 | 10/1991 | Solinsky . |
| 5,062,150 | 10/1991 | Swanson et al. . |
| 5,110,195 | 5/1992 | Loney . |
| 5,282,073 | 1/1994 | Defour et al. . |
| 5,390,040 | 2/1995 | Mayeux . |
| 5,475,520 | 12/1995 | Wissinger . |
| 5,486,690 | 1/1996 | Ake . |
| 5,592,320 | 1/1997 | Wissinger . |
| 5,710,652 | 1/1998 | Bloom et al. . |
| 5,865,832 | * 2/1999 | Knopp et al. .................. 606/10 |

FOREIGN PATENT DOCUMENTS

| 0 482 472 A2 | 10/1991 | (EP) . |
| 0 504 022 A1 | 3/1992 | (EP) . |
| 0 847 149 A1 | 8/1997 | (EP) . |
| 0 863 627 A1 | 10/1997 | (EP) . |
| 0 876 013 A1 | 12/1997 | (EP) . |
| 0 883 253 A1 | 6/1998 | (EP) . |
| 0 887 656 A1 | 9/1998 | (EP) . |

* cited by examiner

Primary Examiner—James Phan
(74) Attorney, Agent, or Firm—McAndrews, Held & Malloy, Ltd.

(57) ABSTRACT

A fine pointing assembly for steering a light beam in an optical inter-satellite communications system is disclosed. The fine pointing assembly (10) includes a mirror (30) connected to an assembly housing (20) by an outer gimbal (40), an inner gimbal (50) and a set of linear motors (60, 61, 62 and 63). The inner gimbal (50) is connected to the assembly housing (20) by flexure pivots (55 and 56) and the outer gimbal (40) is connected to the inner gimbal (50) by flexure pivots (41 and 42). A capacitive position sensor (70 and 80) and signal conditioning circuitry (100) located within the assembly housing (20) sense the position of the mirror (30) and provide feedback used in the control of the linear motors. The position sensor, linear motors and signal conditioning circuitry may include redundant elements. An exemplary embodiment of a fine pointing assembly (10) for pointing a representative 1.5 inch diameter mirror is described that displaces no more than 8 cubic inches.

12 Claims, 9 Drawing Sheets

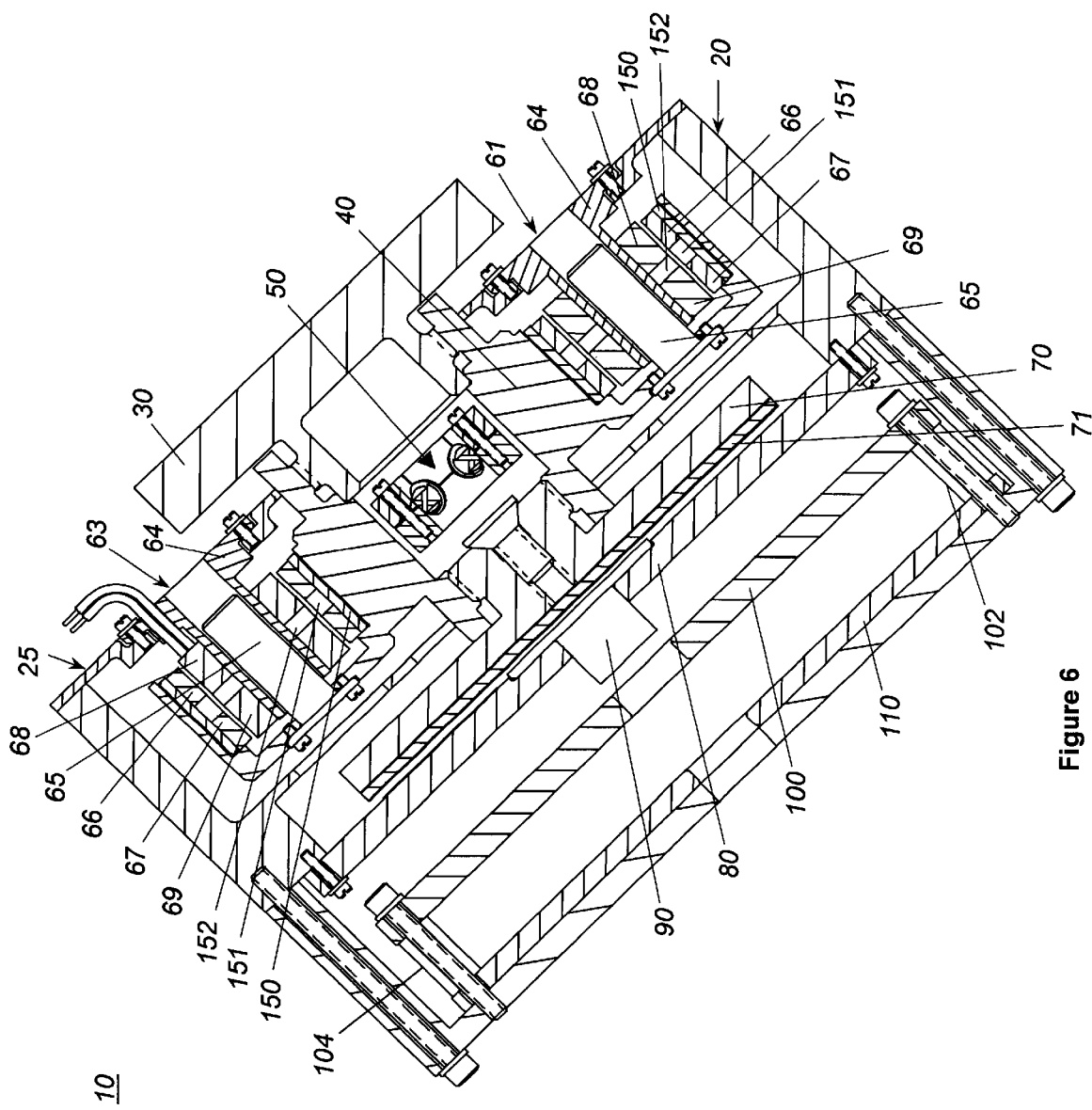

FINE POINTING ASSEMBLY CONFIGURATION

BACKGROUND OF THE INVENTION

The present invention relates generally to the field of optical communications. More specifically, the present invention relates to a fine pointing assembly for a steering mirror, which is used in an optical inter-satellite communications system.

Weight, volumetric displacement and power are critical parameters when designing for satellite-based communications equipment. Higher weight, volumetric displacement and power consumption may lead to higher spacecraft and launch costs and/or reduced payload capacity. Satellite-based communications equipment must also be reliable and durable due to the obvious problem that it will be inaccessible for servicing.

Optical inter-satellite communications systems require steering mechanisms that must provide a large articulation range on two axes (azimuth and elevation) and, at the same time, extreme accuracy and stability. For example, accuracy to within 1 micro-radian may be required. Also, in systems that require rapid scanning or tracking in an unstable (noisy) environment, the steering mechanism must be capable of operating with a high closed-loop bandwidth.

It is an object of the preferred embodiment of the present invention to provide a fine pointing assembly for directing a light beam in an optical inter-satellite communications system.

It is a further object of the preferred embodiment of the present invention to provide a fine pointing assembly that has a small volumetric displacement.

It is a further object of the preferred embodiment of the present invention to provide a fine pointing assembly that is low weight.

It is another object of the preferred embodiment of the present invention to provide a fine pointing assembly that is power efficient.

It is another object of the preferred embodiment of the present invention to provide a fine pointing assembly that is reliable and durable.

It is still another object of the preferred embodiment of the present invention to provide a fine pointing assembly that is accurate, stable and capable of directing a light beam over a large articulation range in two axes.

It is still another object of the preferred embodiment of the present invention to provide a fine pointing assembly that is capable of high closed-loop bandwidth operation.

These and other objects of the present invention are provided by a fine pointing assembly for steering a light beam in an optical inter-satellite communications system. The fine pointing assembly includes a mirror connected to an assembly housing by an outer gimbal, an inner gimbal and a set of linear motors. The inner gimbal is pivotally connected to the housing and the outer gimbal is pivotally connected to the inner gimbal. A position sensor and signal conditioning circuitry located within the housing sense the position of the mirror a provide feedback position signals used in the control of the linear motors.

In one embodiment of the present invention the inner gimbal may be connected to the housing by one or more flexure pivots. The outer gimbal may also be connected to the inner gimbal by one or more flexure pivots.

To ensure reliability and durability, the position sensor may comprise a primary position sensor and a redundant position sensor. The signal conditioning circuitry may also comprise primary signal conditioning circuitry and redundant signal conditioning circuitry. The linear motors may comprise primary motor windings and redundant motor windings.

The position sensor may be of any known type of position sensor but preferably comprises a capacitive sensor for improved accuracy.

According to a preferred embodiment of the present invention, the entire fine pointing assembly for pointing a representative 1.5 inch diameter mirror displaces less than approximately 8 cubic inches.

Other objects, features, and advantages of the present invention will be apparent from the accompanying drawings and from the detailed description that follows below.

BRIEF DESCRIPTION OF THE DRAWINGS

FIG. 6 illustrates a diagonal cross sectional view of the fine pointing assembly according to a preferred embodiment of the present invention.

DETAILED DESCRIPTION OF THE INVENTION

Figure 1:
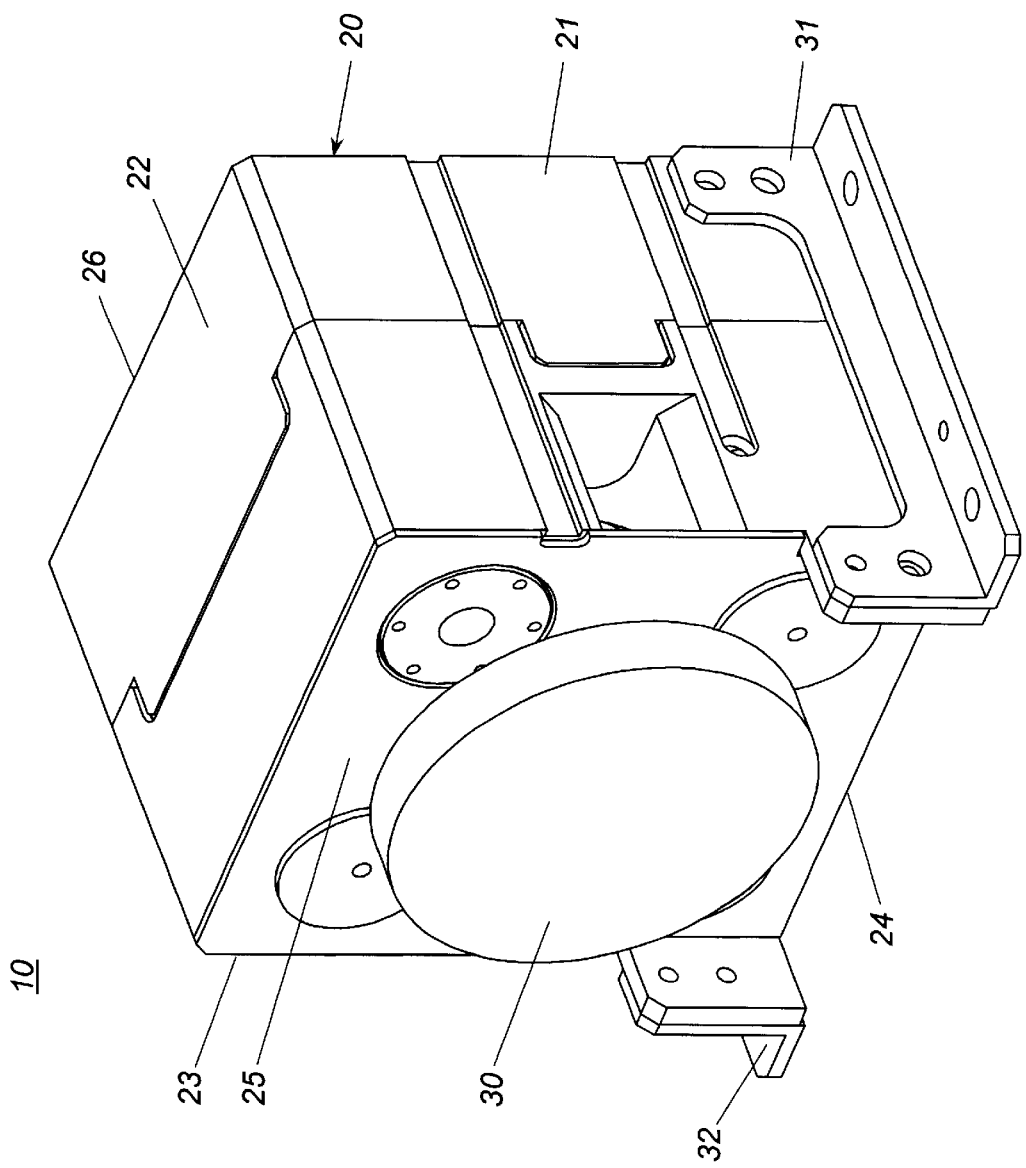
FIG. 1 illustrates a fine pointing assembly according to a preferred embodiment of the present invention.

A fine pointing assembly 10 according to a preferred embodiment of the present invention is illustrated in FIG. 1. The fine pointing assembly 10 is particularly suited for directing a light beam in an optical inter-satellite communications system. The fine pointing assembly 10 includes an assembly housing 20 that is generally cube shaped having four opposing sidewalls 21, 22, 23 and 24, a front cover 25 and a rear cover 26. A pair of mounting brackets 31 and 32 are provided for mounting the fine pointing assembly 10 on or within, for example, a satellite. The assembly housing 20 measures approximately two inches by two inches by two inches (2"×2"×2") in size and is preferably made of a light weight material such as aluminum. A steering mirror 30 is connected to the assembly housing 20 by a gimbal assembly (not shown). The steering mirror 30 is used to reflect a light beam and is made of a stiff, yet light weight material such as beryllium. The beryllium may have an electroless nickel coating that is polished and covered with an enhanced gold or multi-layer dielectric coating to achieve a low wavefront distortion and a high reflectance.

Figure 2:
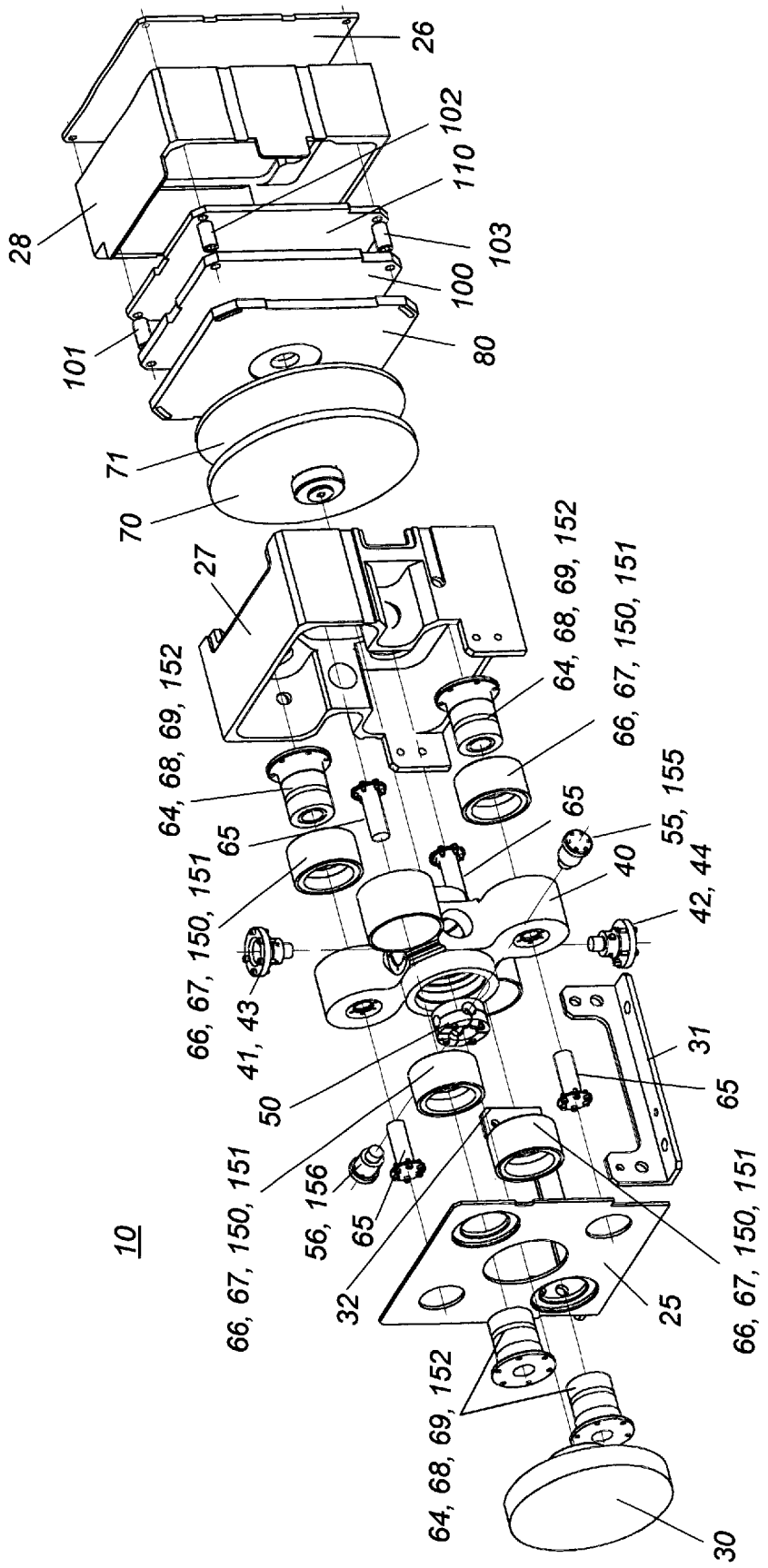
FIG. 2 illustrates an exploded view of the fine pointing assembly according to a preferred embodiment of the present invention.

FIG. 2 illustrates in an exploded view the components of the fine pointing assembly 10. The fine pointing assembly 10 includes the assembly housing 20 (shown here divided into the front cover 25, a drive housing portion 27, an electronics housing portion 28 and a rear cover 26), the steering mirror 30, an outer gimbal 40, an inner gimbal 50, a set of four linear motors (each comprising a rotor 65, 66, 67, 150, 151 and stator 64, 68, 69, 152), a capacitive sensor rotor plate 70 (including a rotor charge plate 71), a capacitive sensor stator plate 80, and signal conditioning circuitry 100 and 110.

Figure 3:
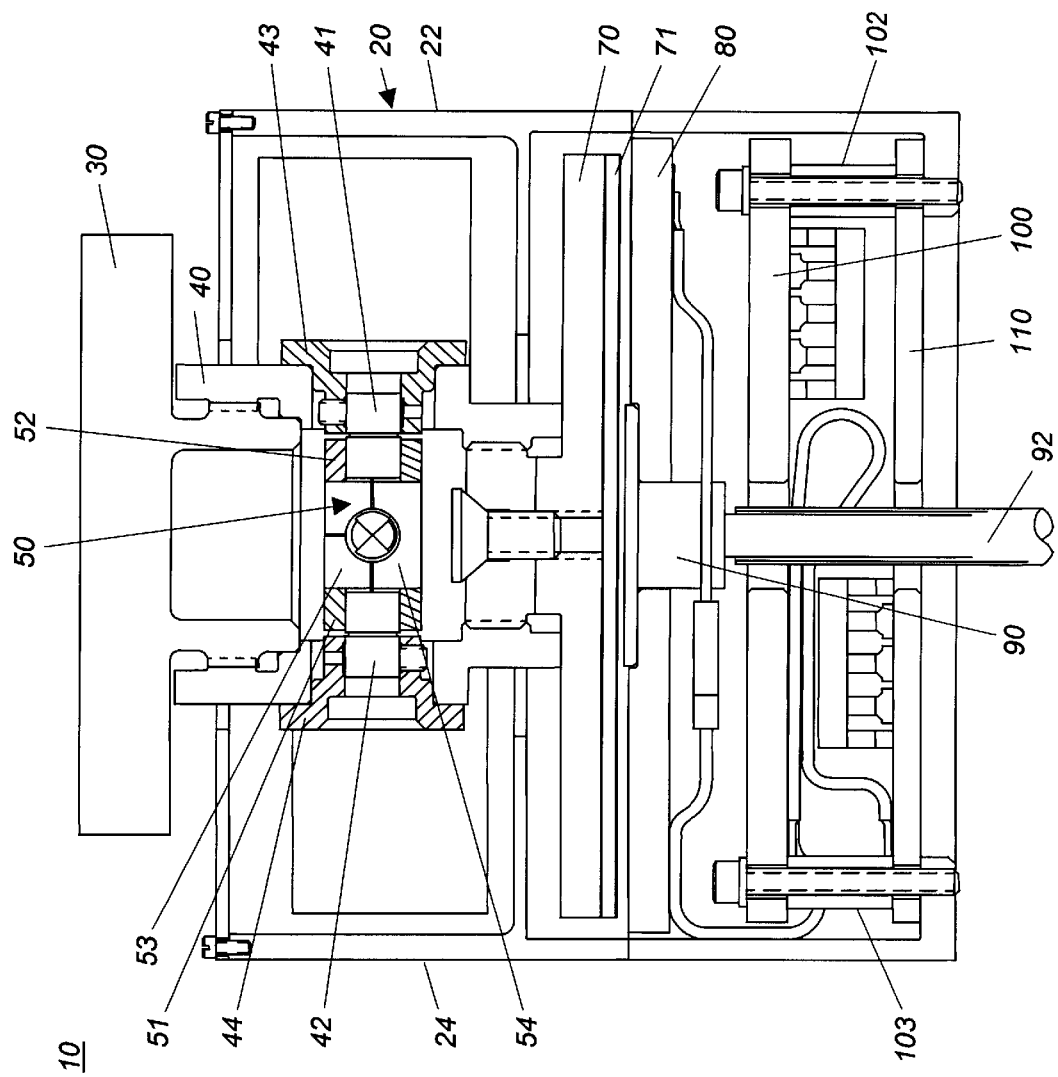
FIG. 3 illustrates a side cross sectional view of the fine pointing assembly according to a preferred embodiment of the present invention.
Figure 4:
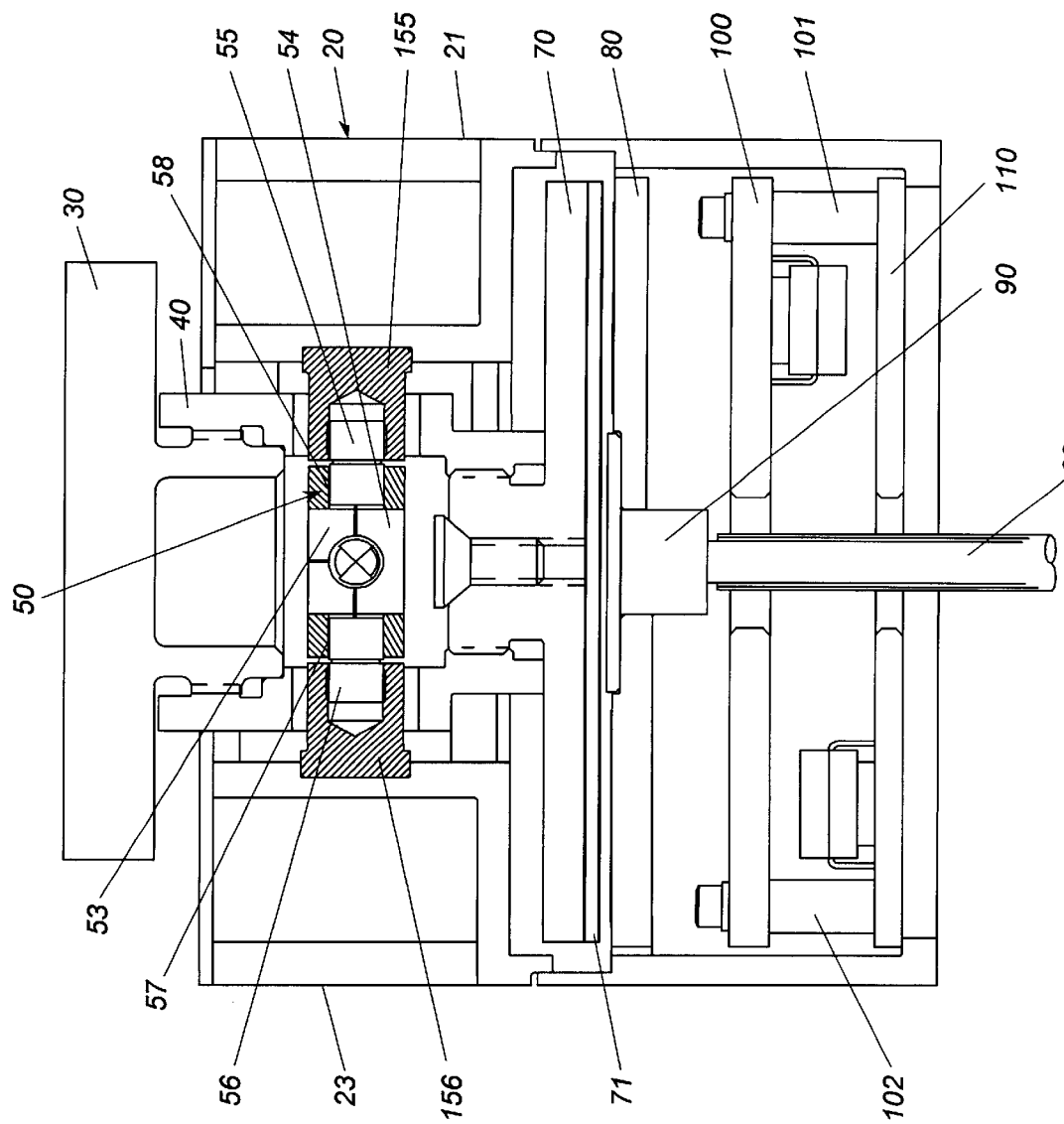
FIG. 4 illustrates a bottom cross sectional view of the fine pointing assembly according to a preferred embodiment of the present invention.
Figure 5:
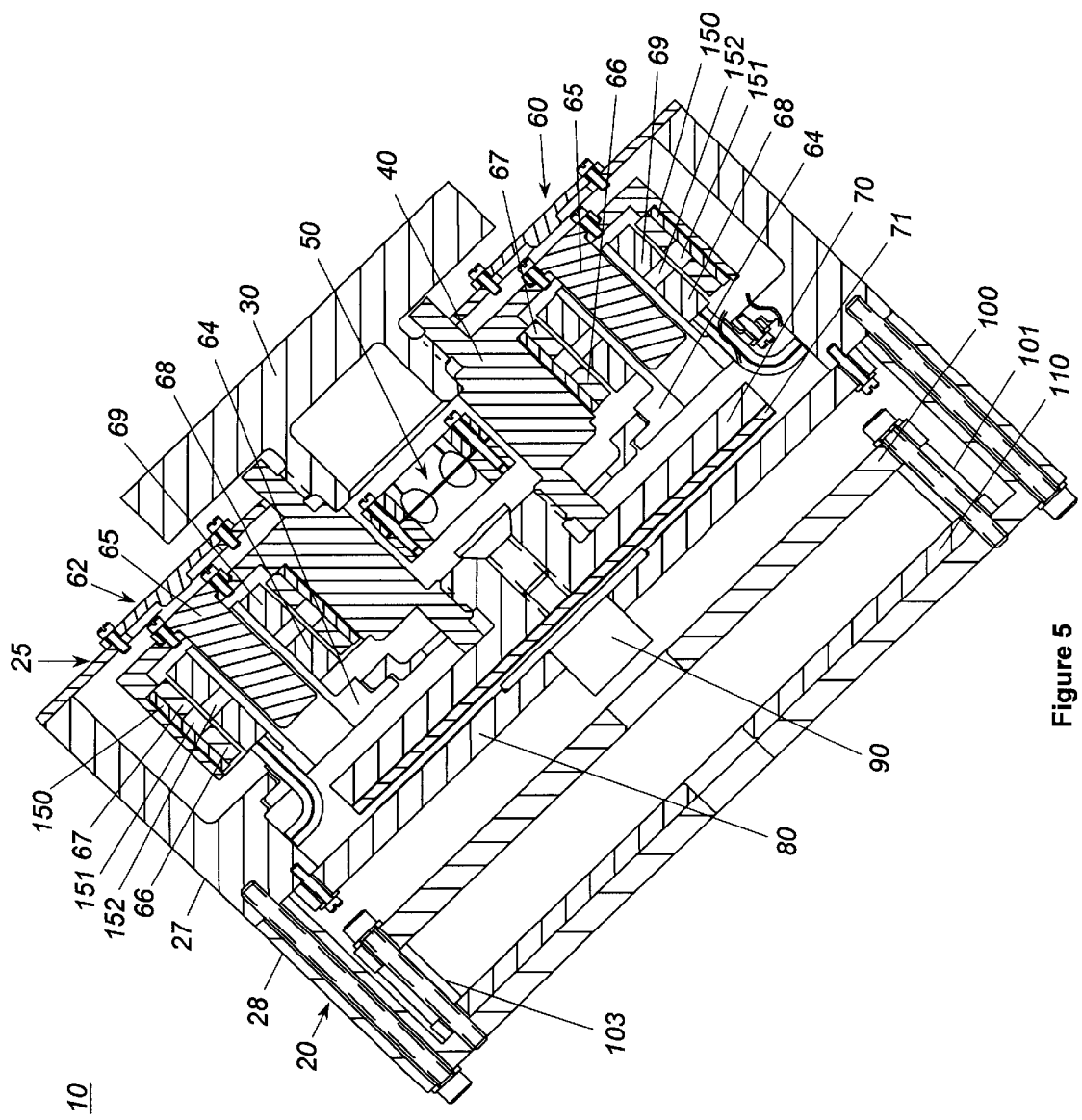
FIG. 5 illustrates a diagonal cross sectional view of the fine pointing assembly according to a preferred embodiment of the present invention.

FIGS. 3, 4, 5 and 6 illustrate cross-sectional views of the fine pointing assembly 10 when fully assembled. FIG. 3 shows a cross-sectional view of the fine pointing assembly 10 taken in a plane that divides the assembly housing 20 in half and that is perpendicular to sidewalls 22 and 24. FIG. 4 shows a cross-sectional view of the fine pointing assembly 10 taken in a plane that divides the assembly housing 20 in half and that is perpendicular to sidewalls 21 and 23. FIG. 5 shows a cross-sectional view of the fine pointing assembly 10 taken in a plane that divides the assembly housing 20 in half, forms a forty-five degree angle with sidewalls 21, 22, 23 and 24, and intersects the lines formed by the intersections of sidewalls 21 and 24 and sidewalls 22 and 23. FIG. 6 shows a cross-sectional view of the fine pointing assembly 10 taken in a plane that divides the assembly housing 20 in half, forms a forty-five degree angle with sidewalls 21, 22, 23 and 24, and intersects the lines formed by the intersections of sidewalls 21 and 22 and sidewalls 23 and 24.

As can be seen in FIGS. 3, 4, 5 and 6, the steering mirror 30 is rigidly connected to the outer gimbal 40. The mirror 30 is preferably secured to the outer gimbal 40 in a manner that induces a minimum distortion of the mirror surface. The outer gimbal 40 is rigidly connected to the rotor plate 70 of the capacitive position sensor. As can be seen in FIG. 3, the outer gimbal 40 is flexurally connected to the inner gimbal 50 by a pair of flexure pivots 41 and 42. The flexure pivots 41 and 42 are secured to the outer gimbal 40 by flexure housings 43 and 44. The flexure pivots 41 and 42 extend into and are secured within cylindrical recesses 51 and 52 formed by upper portions 53 and lower portion 54 of the inner gimbal 50. As can be seen in FIG. 4, the inner gimbal 50 is flexurally connected to the assembly housing 20 by a pair of flexure pivots 55 and 56. The flexure pivots 55 and 56 are secured to the assembly housing 20 by a pair of flexure housings 155 and 156. The flexure pivots 55 and 56 extend into and are secured within cylindrical recesses 57 and 58 formed by the upper portions 53 and lower portion 54 of the inner gimbal 50.

The steering mirror 30, the outer gimbal 40 and the rotor plate 70 all rotate together (as if they are a single component) around the axis of the outer gimbal 40 (formed by the center axis of flexure pivots 41 and 42 (shown in FIG. 3)) and the axis of the inner gimbal 50 (formed by the center axis of flexure pivots 55 and 56 (shown in FIG. 4)). The flexure pivots 41, 42, 55 and 56 are preferably made to have a low torsional stiffness but a high radial and axial stiffness. Part number 5004-600, manufactured by Lucas Aerospace, for example, may be used for flexure pivots 41, 42, 55 and 56. The range of rotation or tilt is preferably approximately one degree (+/−0.5 degrees) or greater.

Movement of the outer gimbal 40, and, thus, the steering mirror 30 and rotor plate 70, is controlled by four linear motors 60, 61, 62 and 63. As shown in FIGS. 5 and 6, each of the linear motors 60, 61, 62 and 63 includes a stator portion (bobbin 64, a pair of electromagnetic coils 68 and 69, and a coil spacer 152) and a rotor portion (post 65, a pair of magnetic rings 66 and 67, magnetic housing 150, and a magnet spacer 151). Magnetic forces generated by the magnetic rings 66 and 67 and electromagnetic coils 68 and 69 push or pull the rotor out of or into the stator. As shown in FIG. 5, two of the linear motors 60 and 62 are oriented so that their stators (64, 68, 69, 152) are secured to the inside of the drive housing 27 portion of the assembly housing 20 and their rotors (65, 66, 67, 150, 151) are secured to the outer gimbal 40. As shown in FIG. 6, the other two linear motors 61 and 63 are oriented so that their rotors (65, 66, 67, 150, 151) are secured to the outer gimbal 40 and their stators (64, 68, 69, 152) are secured to the front cover 25 of the assembly housing 20. The stators (64, 68, 69, 152) are secured to the assembly housing 20 instead of the outer gimbal 40 to provide a heat transfer path and wire accommodation on a stationary part.

Figure 8:
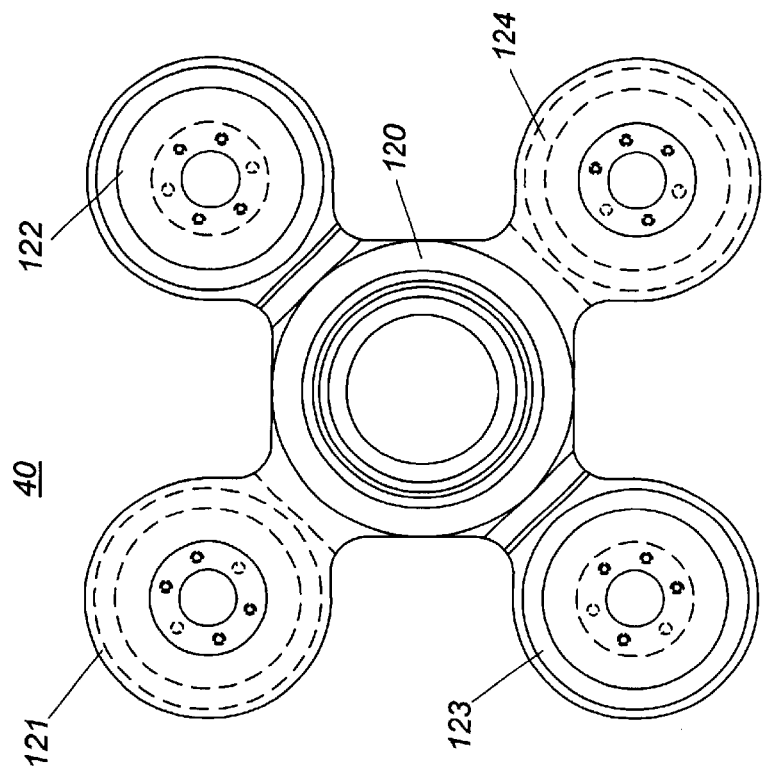
FIG. 8 illustrates a front view of the outer gimbal of the fine pointing assembly according to a preferred embodiment of the present invention.
Figure 7:
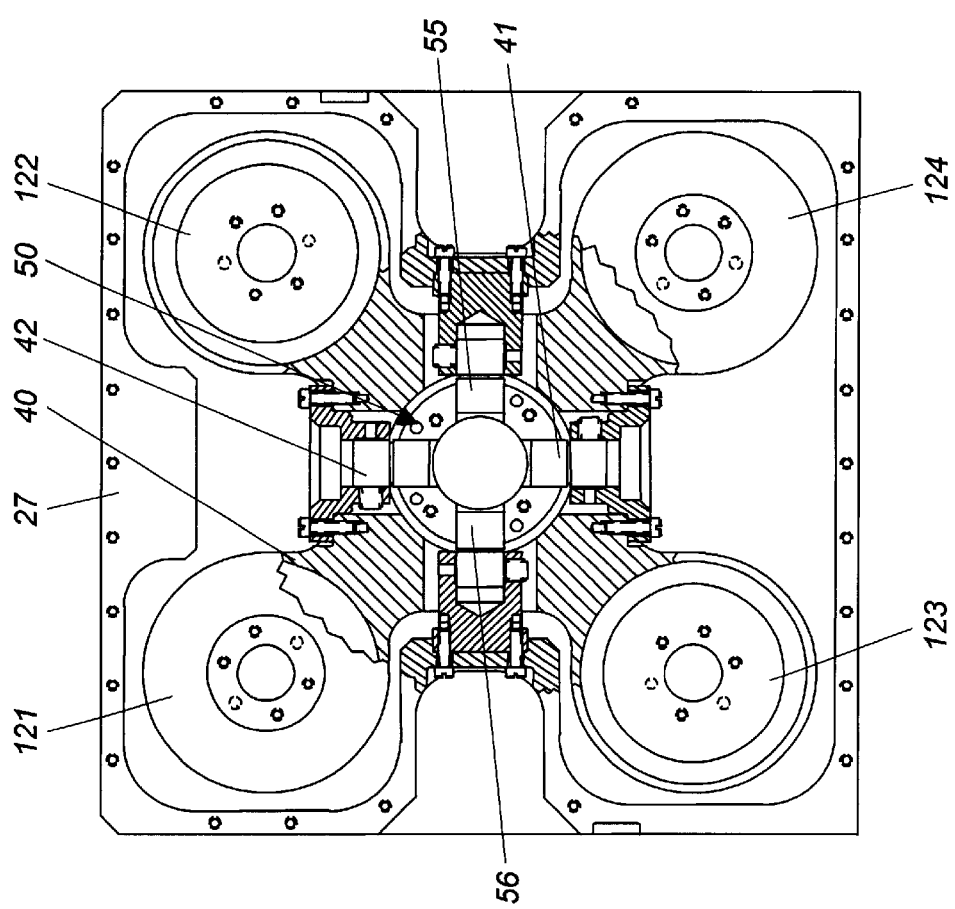
FIG. 7 illustrates a front sectional view of the fine pointing assembly according to a preferred embodiment of the present invention.

As can be seen in FIGS. 5 and 6, the rotor portions (65, 66, 67, 150, 151) of the linear motors 60, 61, 62 and 63 are connected to the outer gimbal 40. It should be apparent from FIGS. 3, 4, 5 and 6 that the linear motors 60, 61, 62 and 63 are not located on the axis of the outer gimbal 40 or inner gimbal 50. Rather, the linear motors 60, 61, 62 and 63 are located forty-five degrees off-axis in the corners of the assembly housing 20. Locating the linear motors off-axis conserves space in the cube-shaped assembly housing 20. FIGS. 7 and 8 show a front view of the outer gimbal 40. The outer gimbal 40 has a center ring 120 and four circular arms 121, 122, 123 and 124 arranged in a clover-leaf pattern. As can be seen in FIG. 7, each of the circular arms 121, 122, 123 and 124 is located on an axis that is rotated forty-five degrees off the axis formed by flexure pivots 41, 42, 55 and 56. A rotor portion 65, 66, 67, 150, 151 of one of the linear motors 60, 61, 62 or 63 (not shown in FIGS. 7 and 8) is connected to each of the circular arms 121, 122, 123 and 124 of the outer gimbal 40.

The direction and magnitude of force generated by linear motors 60, 61, 62 and 63 is controlled based on feedback position signals from signal conditioning circuitry that is located within the assembly housing 20 on the primary electronics board 100. The signal conditioning circuitry receives position feedback signals from the capacitive position sensor. As a failsafe, the fine pointing assembly 10 preferably includes redundant signal conditioning circuitry. The redundant signal conditioning circuitry is located on the redundant electronics board 110. The primary electronics board is preferably 0.093 inch or thicker printed circuit board (PCB) to reduce stray capacitance. The side of the primary electronics board 100 facing the back of the sensor stator plate 80 has a ground plane which serves as a shield between the sensor and electronics. The redundant electronics board 110 may be 0.062 inch PCB since stray capacitance may not be an issue with this board. The primary electronics board 100 and the redundant electronics board 110 are separated by copper stand-offs 101, 102, 103 and 104, which facilitate heat transfer to the assembly housing 20.

The position (or tilt) of the steering mirror 30 is detected by a capacitive position sensor that includes the rotor plate 70, the stator plate 80 and the charge plug 90. The rotor plate 70 and the stator plate 80 are separated by a small air gap. The charge plug 90, which receives an excitation signal via coaxial cable 92 (see FIGS. 3 and 4), charges the rotor charge plate 71. As described below in more detail, the distance between the rotor charge plate 71 and a number of locations on the stator plate 80 can be determined by measuring the effective capacitance between the rotor charge plate 71 and stator plate 80 at a number of locations. The direction and amount of tilt of the steering mirror 30 can be deduced from the distance measurements.

The rotor plate 70 may be fabricated from aluminum and may be hard anodized. The rotor plate 70 includes a rotor charge plate 71, which is bonded to the surface of the rotor plate 70 that faces the stator plate 80. The hard anodization of the rotor plate 70 reduces stray capacitance between the rotor charge plate 71 and the rotor plate 70 so that the capacitive feedback signal is not diminished. The rotor charge plate 71 may be fabricated from 0.031 inch PCB material. The charged surface may be copper with a gold protective coating. The PCB material is used for the rotor charge plate 71 to reduce stray capacitance.

Figure 9:
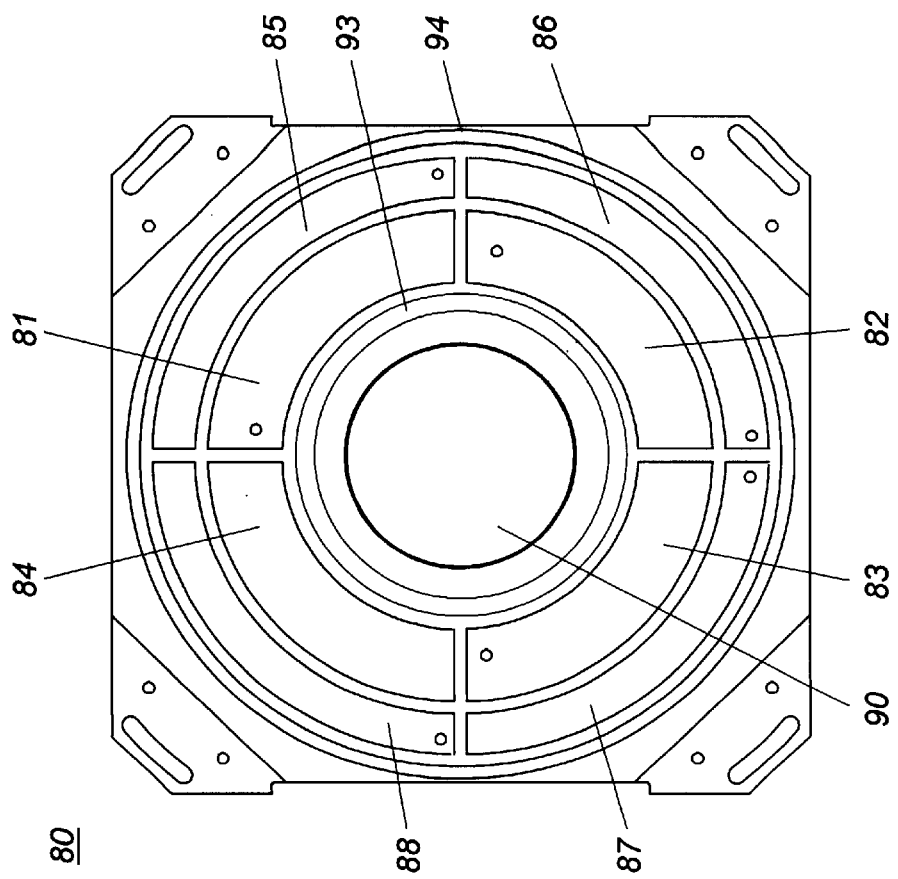
FIG. 9 illustrates a front view of a portion of a capacitive position sensor according to a preferred embodiment of the present invention.

FIG. 9 illustrates a front view of the stator plate 80. The stator plate preferably may be fabricated from 0.093 inch PCB. The stator plate 80 includes a symmetrical pattern of eight sensing segments 81, 82, 83, 84, 85, 86, 87 and 88. Sensing segments 81, 82, 83 and 84 are used for primary sensing while sensing segments 85, 86, 87, and 88 are redundant elements that may be used in the event of failure of the primary sensing elements 81, 82, 83 and 84 or primary sensor circuitry 100. The sensing segments are balanced so that the capacitance of a primary sector is equal to the capacitance of a redundant sector. The charge plug 90, which passes through the center of the stator plate 80, carries an electrical excitation signal. The charge plug 90 and sensing segments 81, 82, 83, 84, 85, 86, 87 and 88 may be copper with a gold protective coating. A pair of Kelvin rings 93 and 94 are embedded in the stator plate 80. The Kelvin rings 93 and 94 improve sensor linearity by reducing stray capacitance and fringing effects. As the rotor plate 70 tilts, the distance between the rotor plate 70 and one or more of the sensing segments will become smaller while the distance becomes larger for one or more of the other sensing segments. Direction and degree of tilt of the rotor plate 70 can be determined by measuring the effective capacitance between each of the sensing segments 81, 82, 83 and 84 (or 85, 86, 87 and 88 in the case of redundant sensing) of the stator plate 80 and the rotor charge plate 71.

Figure 10:
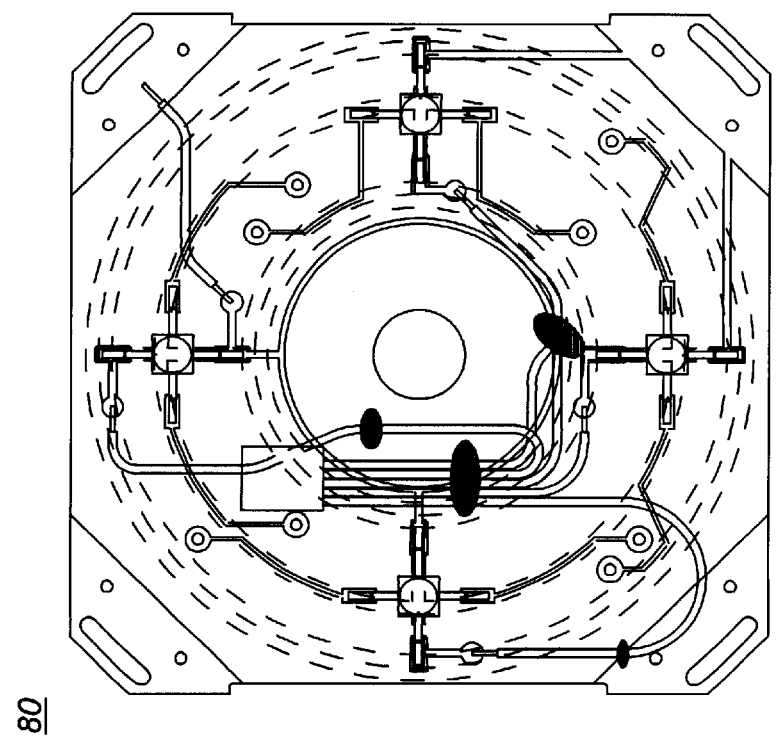
FIG. 10 illustrates a back view of a portion of a capacitive position sensor according to a preferred embodiment of the present invention.

FIG. 10 illustrates the back side of the stator plate 80. Demodulation circuitry for the capacitive position sensor is preferably located on the back side of the stator plate 80 (the side nearest the primary electronics board 100). This arrangement minimizes the distance from the sensing segments 81, 82, 83 and 84 to the demodulation circuitry. Preferably, plated through-holes and circuit traces are used for the connection between the segments 81, 82, 83 and 84 and the demodulation circuitry instead of wires to reduce stray capacitance. Also, stray capacitance may be further reduced by arranging the demodulation circuitry so that it does not lie directly behind the sensing segments 81, 82, 83 and 84 (or 85, 86, 87, and 88 in the case of redundant sensing).

Figure 11:
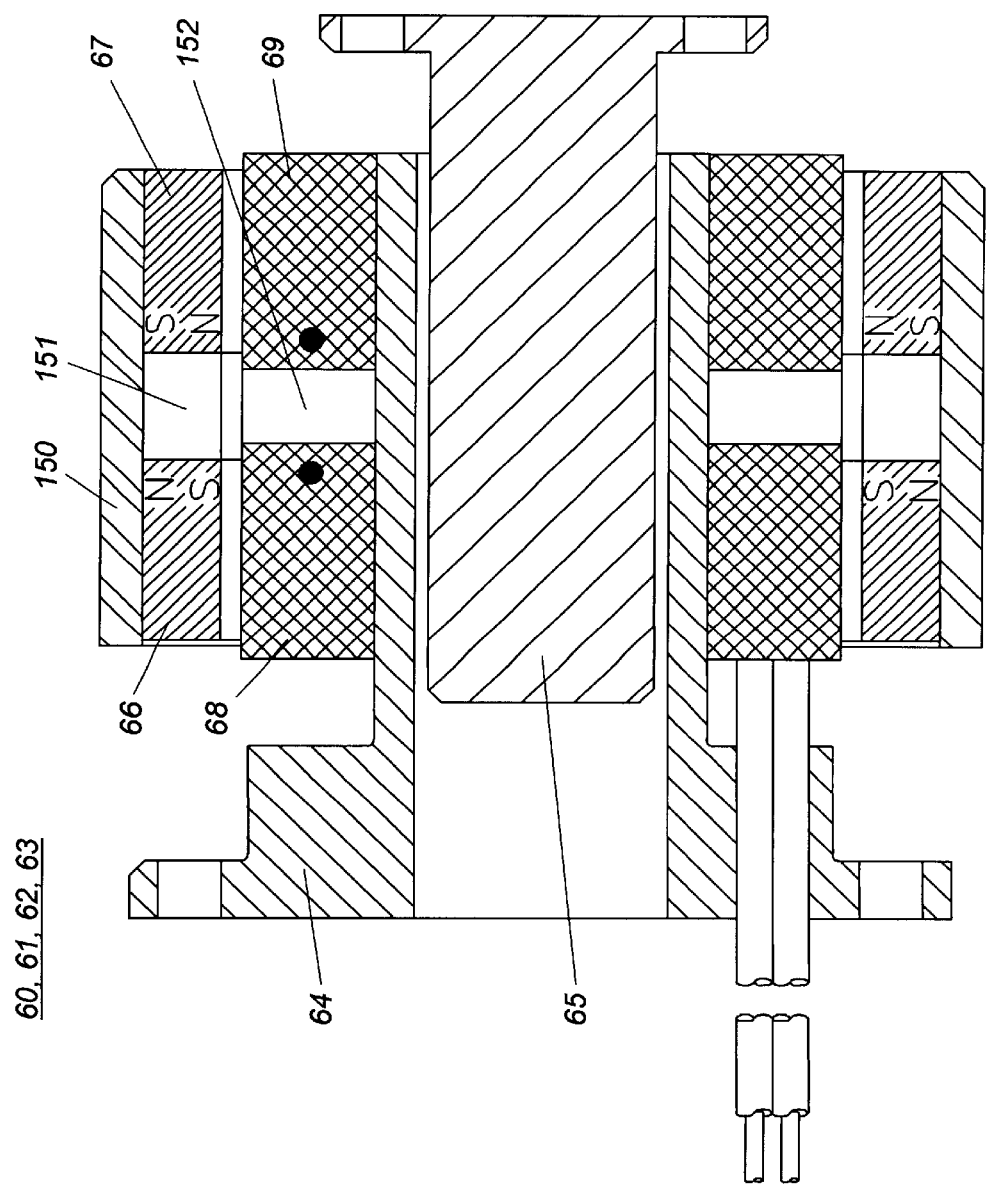
FIG. 11 illustrates a side sectional view of a linear motor of the fine pointing assembly according to a preferred embodiment of the present invention.

FIG. 11 illustrates a cross-sectional view of a linear motor design that may be employed as linear motor 60, 61, 62 and 63 in the fine pointing assembly 10. Linear motors are preferable over piezo-type actuators for increased articulation range, robustness, and low voltage operation. It should be noted, however, that other types of linear actuators may be used. Each of the linear motors 60, 61, 62 and 63 includes a bobbin 64, a post 65, a pair of magnetic rings 66 and 67, and a pair of electromagnetic coils 68 and 69. One magnetic ring 67 has its south pole on the outside while the other magnetic ring 66 has its south pole on the inside. A magnet housing 150 surrounds the magnetic rings 66 and 67 and a magnet spacer 151 separates magnetic ring 66 from magnetic ring 67. Magnetic forces generated by the magnetic rings 66 and 67 and electromagnetic coils 68 and 69 push or pull the bobbin 64 and its electromagnetic coils 68 and 69 out of or into the space between the post 65 and magnetic rings 66 and 67. Electromagnetic coil 68 is wound in the opposite direction of electromagnetic coil 69 to cancel induced emf and improve linearity. The electromagnetic coils 68 and 69 are separated by a coil spacer 152. A pair of redundant electromagnetic coils (not shown) may be wound concentrically with electromagnetic coils 68 and 69, respectively.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarding in an illustrative rather than restrictive sense.

What is claimed is:

1. An apparatus for directing a steering mirror in an optical communications system comprising:
   an assembly housing;
   a steering mirror for directing a light beam;
   an outer gimbal located within said assembly housing connected to the steering mirror;
   an inner gimbal located within said assembly housing rotatably connected to the outer gimbal on a first axis and to the assembly housing on a second axis;
   a set of linear actuators located within said assembly housing operable to tilt the steering mirror about said first and second axes;
   a position sensor located within said assembly housing connected to the outer gimbal for sensing the direction and magnitude of tilt of the steering mirror; and
   conditioning circuitry responsive to said position sensor for providing feedback utilized in controlling said linear motors.

2. An apparatus according to claim 1 wherein the inner gimbal is flexurally connected to the assembly housing by one or more flexure pivots.

3. An apparatus according to claim 1 wherein the outer gimbal is flexurally connected to the inner gimbal by one or more flexure pivots.

4. An apparatus according to claim 1 wherein the position sensor comprises a primary position sensor and a redundant position sensor.

5. An apparatus according to claim 1 wherein the set of linear actuators comprises four linear motors connected to the outer gimbal and the assembly housing.

6. An apparatus according to claim 5 wherein each of the linear motors are located off the axes of the inner gimbal and outer gimbal.

7. An apparatus according to claim 1 wherein each linear motor of the set of linear actuators comprises primary motor windings and redundant motor windings.

8. An apparatus according to claim 1 wherein the signal conditioning circuitry comprises primary signal conditioning circuitry and redundant signal conditioning circuitry.

9. An apparatus according to claim 8 wherein said primary signal conditioning circuitry and said redundant signal conditioning circuitry is located within said assembly housing.

10. An apparatus according to claim 1 wherein the signal conditioning circuitry is located within said assembly housing.

11. An apparatus according to claim 1 wherein the position sensor comprises a capacitive position sensor.

12. An apparatus according to claim 11 wherein said capacitive position sensor comprises a capacitive sensor rotor plate connected to said outer gimbal and a capacitive sensor stator plate rigidly connected to said assembly housing.

* * * * *